(12) United States Patent
Sellappan et al.

(10) Patent No.: US 12,233,572 B2
(45) Date of Patent: Feb. 25, 2025

(54) METHODS TO ELIMINATE MUDCRACKS IN CMC MATRIX BY HUMIDITY CONTROLLED ATMOSPHERE

(71) Applicant: Rolls-Royce High Temperature Composites Inc., Cypress, CA (US)

(72) Inventors: Pathikumar Sellappan, Seal Beach, CA (US); Sungbo Shim, Irvine, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 693 days.

(21) Appl. No.: 17/015,840

(22) Filed: Sep. 9, 2020

(65) Prior Publication Data

US 2021/0069931 A1    Mar. 11, 2021

Related U.S. Application Data

(60) Provisional application No. 62/898,187, filed on Sep. 10, 2019.

(51) Int. Cl.
*B28B 11/24*    (2006.01)
*C04B 35/64*    (2006.01)

(52) U.S. Cl.
CPC ............ *B28B 11/247* (2013.01); *C04B 35/64* (2013.01); *C04B 2235/616* (2013.01); *C04B 2235/65* (2013.01)

(58) Field of Classification Search
CPC .................................................... B28B 11/247
See application file for complete search history.

(56) References Cited

U.S. PATENT DOCUMENTS

| | | | |
|---|---|---|---|
| 8,562,901 B1 | 10/2013 | Mah et al. | |
| 2013/0221554 A1* | 8/2013 | Jung | A61C 13/083 264/16 |
| 2015/0299052 A1 | 10/2015 | Allemand et al. | |
| 2016/0095798 A1* | 4/2016 | Brodkin | A61C 7/08 264/16 |
| 2019/0210930 A1 | 7/2019 | Knohl et al. | |
| 2020/0268616 A1* | 8/2020 | Wang | B29B 7/90 |

OTHER PUBLICATIONS

Ywh-Pyng Harn, S. Ghosal, G. Aral, A. Emami-Naeini, B. Draskovich and C. Maxey, "Real-time model-based control system design and automation for gelcast drying process," Proceedings of the 1997 IEEE International Conference on Control Applications, Hartford, CT, USA, 1997, pp. 271-276 (Year: 1997).*

(Continued)

*Primary Examiner* — Robert A Vetere
(74) *Attorney, Agent, or Firm* — Shumaker & Sieffert, P.A.

(57) ABSTRACT

Methods of reducing dry crack formation in ceramic matrix composite green bodies are provided. Some of the methods expose the green body to a gaseous atmosphere at a relatively high humidity for a first period, and then slowly lower the humidity over a second period, where the gaseous atmosphere is at room temperature for both periods. Other methods start the gaseous atmosphere at room temperature and then raise the temperature to a higher temperature while the humidity is relatively high, and hold that temperature even as the humidity is lowered in the second period.

11 Claims, 4 Drawing Sheets

(56) References Cited

OTHER PUBLICATIONS

Ibram Ganesh et al., "An Aqueous Gelcasting Process for Sintered Silicon Carbide Ceramics," Journal of the American Ceramic Society, dated Oct. 2006, pp. 3056-3064, vol. 89, No. 10, published online by the American Ceramic Society at URL https://doi.org/10.1111/j.1551-2916.2006.01198.x.

Dulal Chandra Jana et al., "Effect of monomers content in enhancing solid-state densification of silicon carbide ceramics by aqueous gelcasting and pressureless sintering," Ceramics International, dated Dec. 23, 2016, pp. 4852-4857, vol. 43, Issue 6, published online by Science Direct, Elsevier Ltd and Techna Group S.r.l. at URL https://doi.org/10.1016/j.ceramint.2016.12.117.

Fei Li et al., "Effect of polyethylene glycol on the surface exfoliation of SiC green bodies prepared by gelcasting," Materials Science and Engineering A, dated Jan. 28, 2004, pp. 255-259, vol. 468, published online by Elsevier B.V. at URL https://doi.org/10.1016/j.msea.2003.11.013.

Longjie Zhou et al., "Gas-discharging reactions and their effect on the microstructures of green bodies in gelcasting of non-oxide materials," Materials Letters, dated Feb. 11, 2000, pp. 51-57, vol. 45, Issue 1, published online by Elsevier B.V. at URL https://doi.org/10.1016/S0167-577X(00)00074-4.

Albert C. Young et al., "Gelcasting of Alumina," Journal of the American Ceramic Society, dated Mar. 1991, pp. 612-618, vol. 74, Issue 3, published online by the American Ceramic Society at URL https://doi.org/10.1111/j.1151-2916.1991.tb04068.x.

Longjie Zhou et al., "Gelcasting of concentrated aqueous silicon carbide suspension," Journal of the European Ceramic Society, dated May 11, 1999, pp. 85-90, vol. 20, Issue 1, published online by ResearchGate at URL https://www.researchgate.net/deref/http%3A%2F%2Fdx.doi.org%2F10.1016%2FS0955-2219(99)00138-7.

R. Gilissen et al., "Gelcasting, a near net shape technique," Materials and Design, dated Aug. 1, 2000, pp. 251-257, vol. 21, Issue 4, published online by Elsevier Science Ltd. at URL https://doi.org/10.1016/S0261-3069(99)00075-8.

Jingxian Zhang et al., "Properties of silicon carbide ceramics from gelcasting and pressureless sintering," Materials and Design, dated Jan. 2015, pp. 12-16, vol. 65, published online by Elsevier Ltd. at URL https://doi.org/10.1016/j.matdes.2014.08.034.

Jinlong Yang et al., "Recent development in gelcasting of ceramics," dated Nov. 2011, pp. 2569-2591, vol. 31, Issue 14, published online by Elsevier Ltd. at URL https://doi.org/10.1016/j.jeurceramsoc.2010.12.035.

* cited by examiner

METHODS TO ELIMINATE MUDCRACKS IN CMC MATRIX BY HUMIDITY CONTROLLED ATMOSPHERE

CROSS-REFERENCE TO RELATED APPLICATIONS

This application is a non-provisional of U.S. Provisional Patent Application 62/898,187 filed Sep. 10, 2020, which is incorporated by reference.

TECHNICAL FIELD

This disclosure relates to ceramic matrix composites and, in particular, to processing slurry-infiltrated ceramic fiber preforms.

BACKGROUND

Present methods of processing slurry-infiltrated ceramic fiber preforms suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
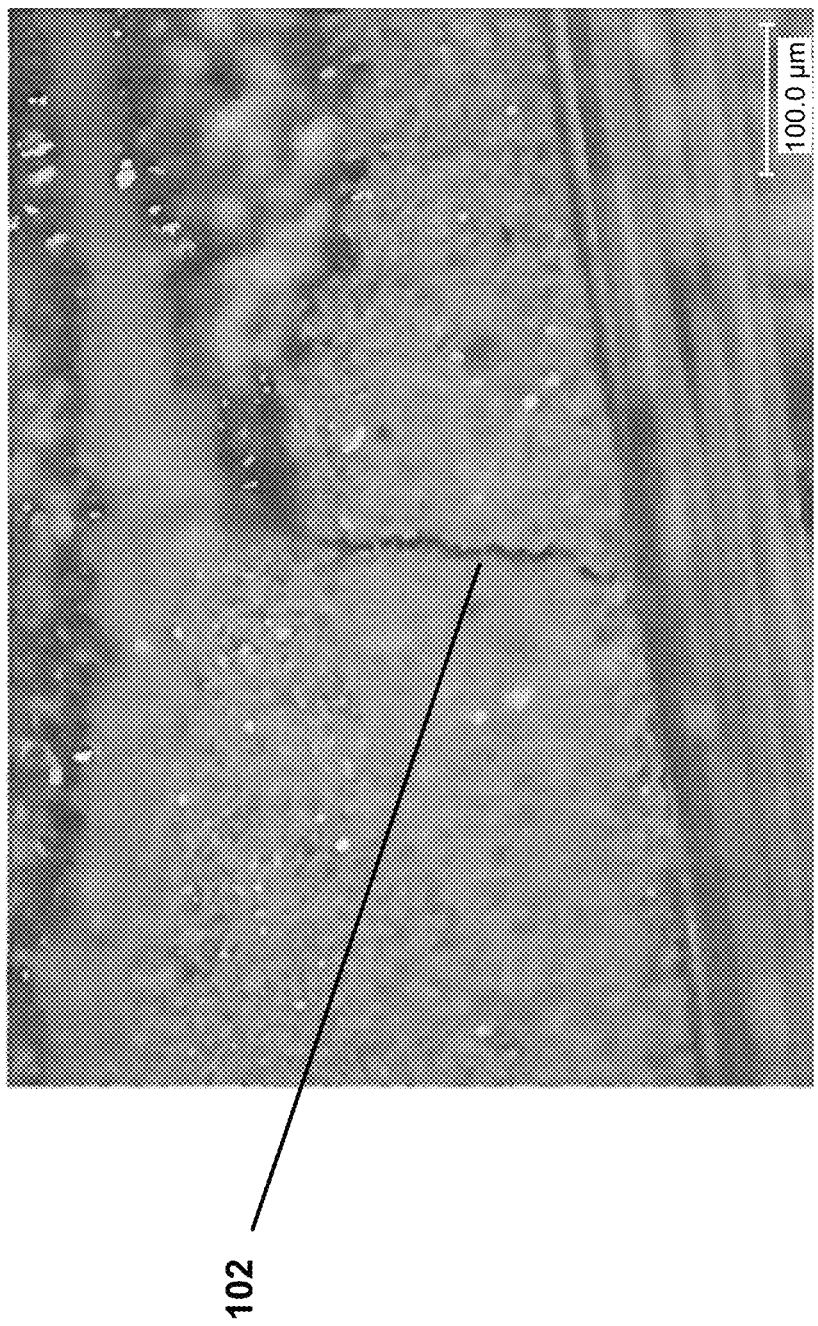
FIG. 1 shows a dry crack 102 in the matrix material of ceramic matrix composite (CMC)
Figure 2:
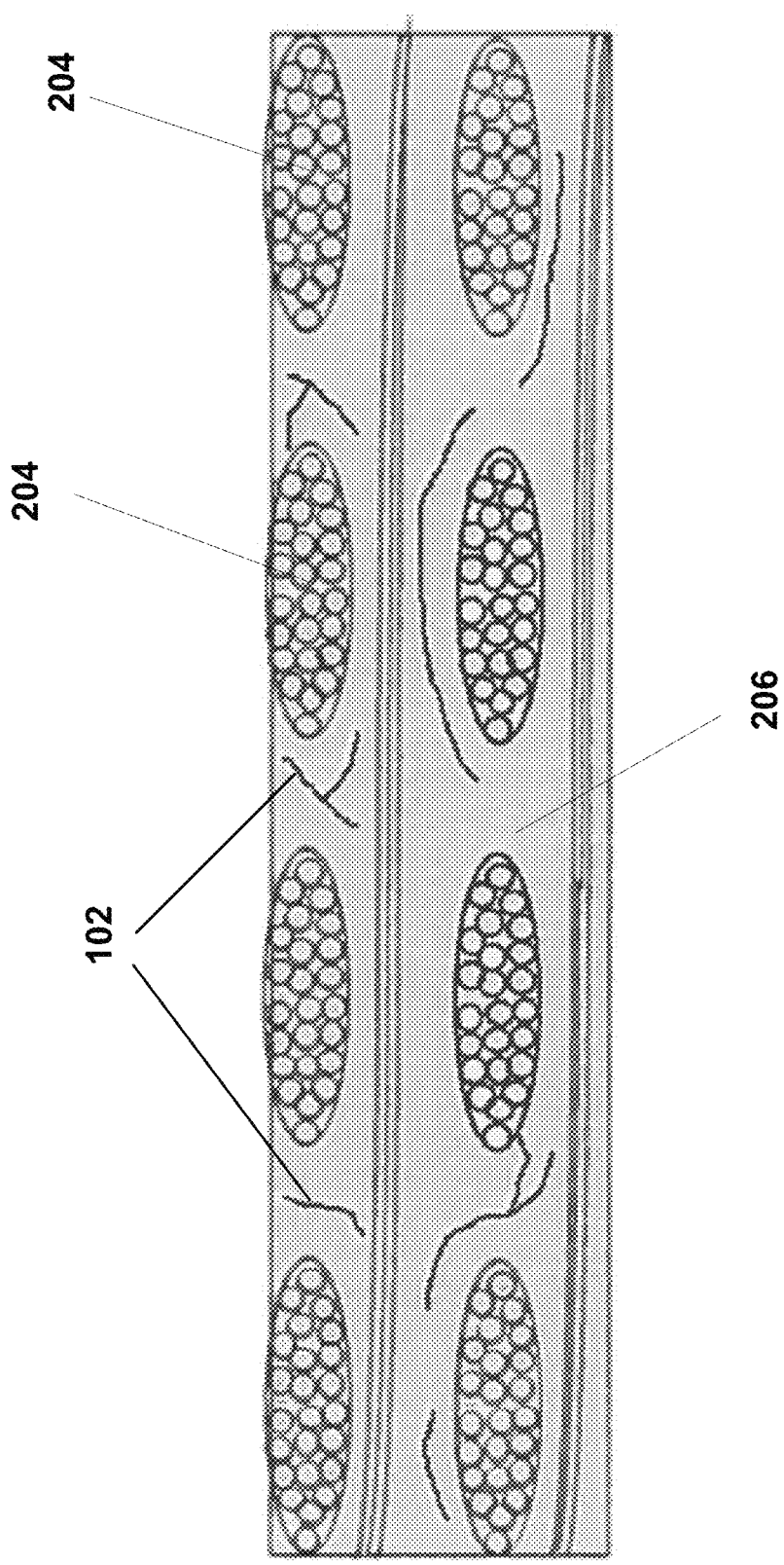
FIG. 2 illustrates a schematic of the CMC's microstructure with unfilled dry cracks.

Current drying stages of ceramic matrix composite (CMC) matrix development may result in mudcracks even right after slurry infiltration and before melt infiltration. For example, FIG. 1 shows a dry crack 102 in the matrix material of CMC, which is formed during the drying stage after slurry infiltration. Ceramic matrix composites lose a substantial amount of weight (for example, ≥15-20 percent) from just after slurry infiltration until the end of the drying cycle (before melt infiltration). An uncontrolled release of water at an early stage of drying leads to the formation of dry cracks 102, which are difficult to be infiltrated during the melt infiltration stage. FIG. 2 illustrates a schematic of the CMC's microstructure with unfilled dry cracks 102. Fiber bundles 204 are shown distributed throughout the matrix material 206.

Novel methods of controlling humidity conditions and temperature during the drying of a slurry-infiltrated ceramic fiber preform are described below. The methods help achieve a gradual removal of water molecules from the matrix material 206, which results in reducing or eliminating the cracks 102. In addition, an interesting feature of the methods described below is that the cracks 102 in the matrix material 206 may be reduced or eliminated while still completing the drying process relatively quickly.

Figure 3:
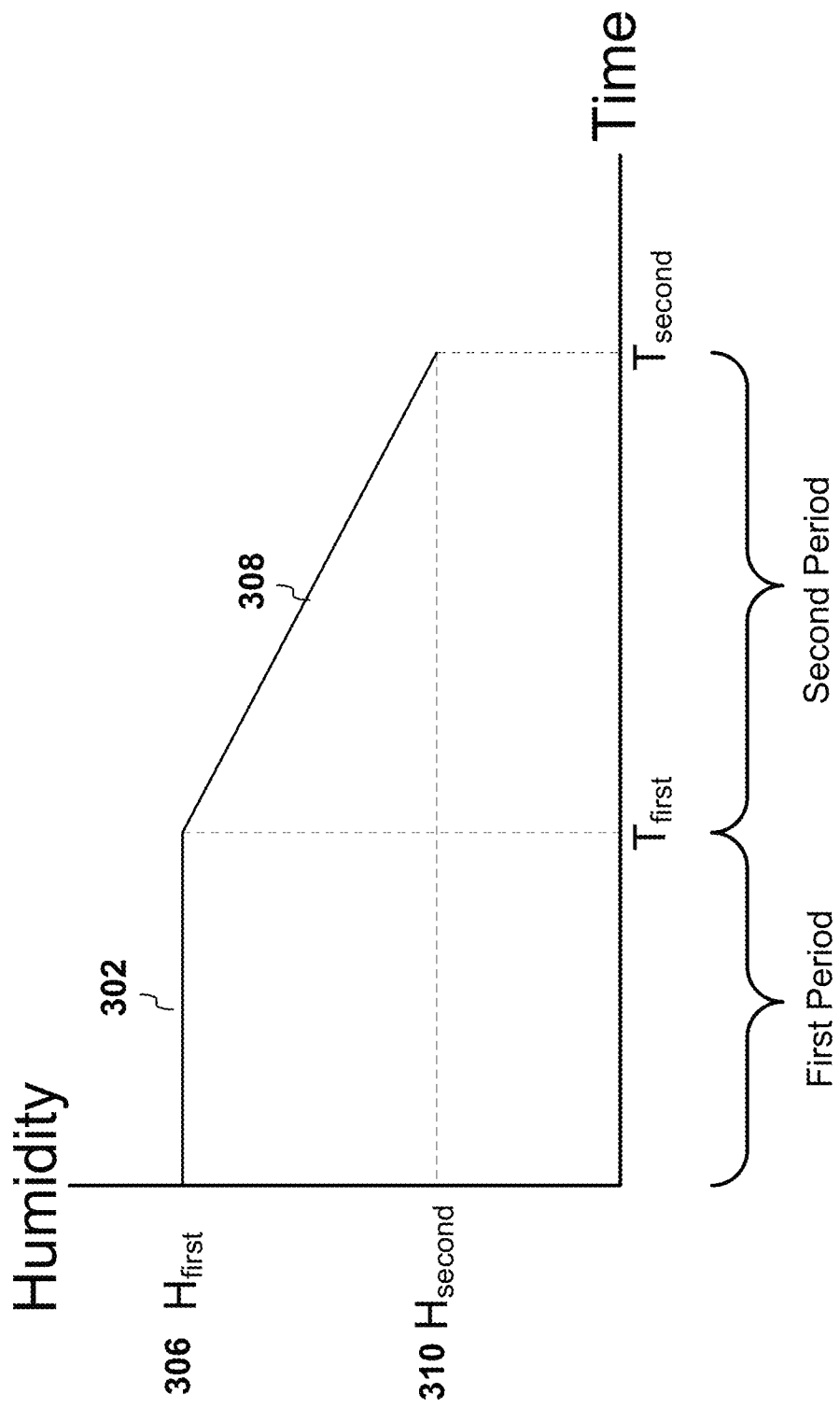
FIG. 3 illustrates a first method of reducing dry crack formation.

FIG. 3 illustrates a method of reducing dry crack formation in which an outer surface of a green body is exposed to a gaseous atmosphere at room temperature while the humidity of the gaseous atmosphere is varied. Operations begin by exposing (302) an outer surface of a green body to a gaseous atmosphere having a first humidity 306 for a first period of time at room temperature. The first humidity 306 is a relatively high humidity. For example, the first humidity 306 may be a relative humidity within a range of about 40 percent to 100 percent. Alternatively, the first humidity 306 may be a relative humidity within a range of about 70 percent to 95 percent. In some examples, the first humidity 306 may be a relative humidity within a range of about 85 percent to 95 percent. In another example, the first humidity 306 may be a relative humidity within a range of about 90 percent to about 95 percent. In still other examples, the first humidity 306 may be a relative humidity within a range of about 80 percent to 90 percent.

Operations may continue by reducing (308) the humidity of the gaseous atmosphere, while the outer surface of the green body is exposed to the gaseous atmosphere at room temperature, from the first humidity 306 to a second humidity 310 over a second period of time. The second humidity may be a relative humidity within a range of about 50 percent to about 65 percent. In another example, the second humidity 310 may be a relative humidity within a range of about 45 percent to about 60 percent.

The first period of time may be within a range of about six hours to about 12 hours. For example, the first period of time may be 12 hours. The second period of time may be within a range of about 12 hours to about 18 hours. For example, the second period of time may be 16 hours.

The green body is a slurry-infiltrated ceramic fiber preform. A slurry-infiltrated ceramic fiber preform may comprise a ceramic fiber preform that has been impregnated or infiltrated with a slurry comprising ceramic particles (and optionally reactive elements) and an aqueous or organic fluid such as water. The ceramic fiber preform may be produced by laying up plies as known in the art, where each ply includes an arrangement of ceramic fibers (e.g., in tows, woven, nonwoven, etc.) Alternatively or in addition, the slurry-infiltrated ceramic fiber preform may comprise multiple pre-impregnated (prepreg) layers, each in the form of a "tape". The green body has not yet been cured.

The gaseous atmosphere may comprise one or more gases that includes water vapor. The gaseous atmosphere may include, for example, air. The gaseous atmosphere may be at one atmosphere of pressure. Alternatively, the gaseous atmosphere may be at any pressure different than one atmosphere of pressure.

Room temperature may be any temperature in a range from 18° C. to 25° C. Alternatively, room temperature may be any temperature in a range from 20° C. to 22° C. Alternatively or in addition, room temperature may be the temperature of the ambient air in the room in which the green body is located.

As shown in FIG. 3, reducing (308) the humidity of the gaseous atmosphere over the second period of time may comprise reducing the humidity of the gaseous atmosphere substantially linearly during the second period of time. Alternatively, reducing (308) the humidity of the gaseous atmosphere over the second period of time may comprise reducing the humidity of the gaseous atmosphere substantially exponentially during the second period of time. Alternatively or in addition, reducing (308) the humidity of the gaseous atmosphere over the second period of time may comprise reducing the humidity of the gaseous atmosphere without any increase in the humidity of the gaseous atmosphere during the second period of time. In some examples, reducing (308) the humidity of the gaseous atmosphere over the second period of time comprises reducing the humidity of the gaseous atmosphere more slowly during a first part of the second period of time than during a second part of the second period of time. Alternatively, reducing (308) the humidity of the gaseous atmosphere over the second period of time comprises reducing the humidity of the gaseous atmosphere faster during a first part of the second period of time than during a second part of the second period of time.

Exposure of the outer surface of the green body to the first humidity limits moisture differentials within the green body during the first period as compared to a humidity that is lower than the first humidity. Exposure of the outer surface of the green body to the first humidity during the first period limits a moisture differential within the green body during the second period. By limiting moisture differentials, shrinkage stresses are reduced. Shrinkage stresses induce drying cracks.

Figure 4:
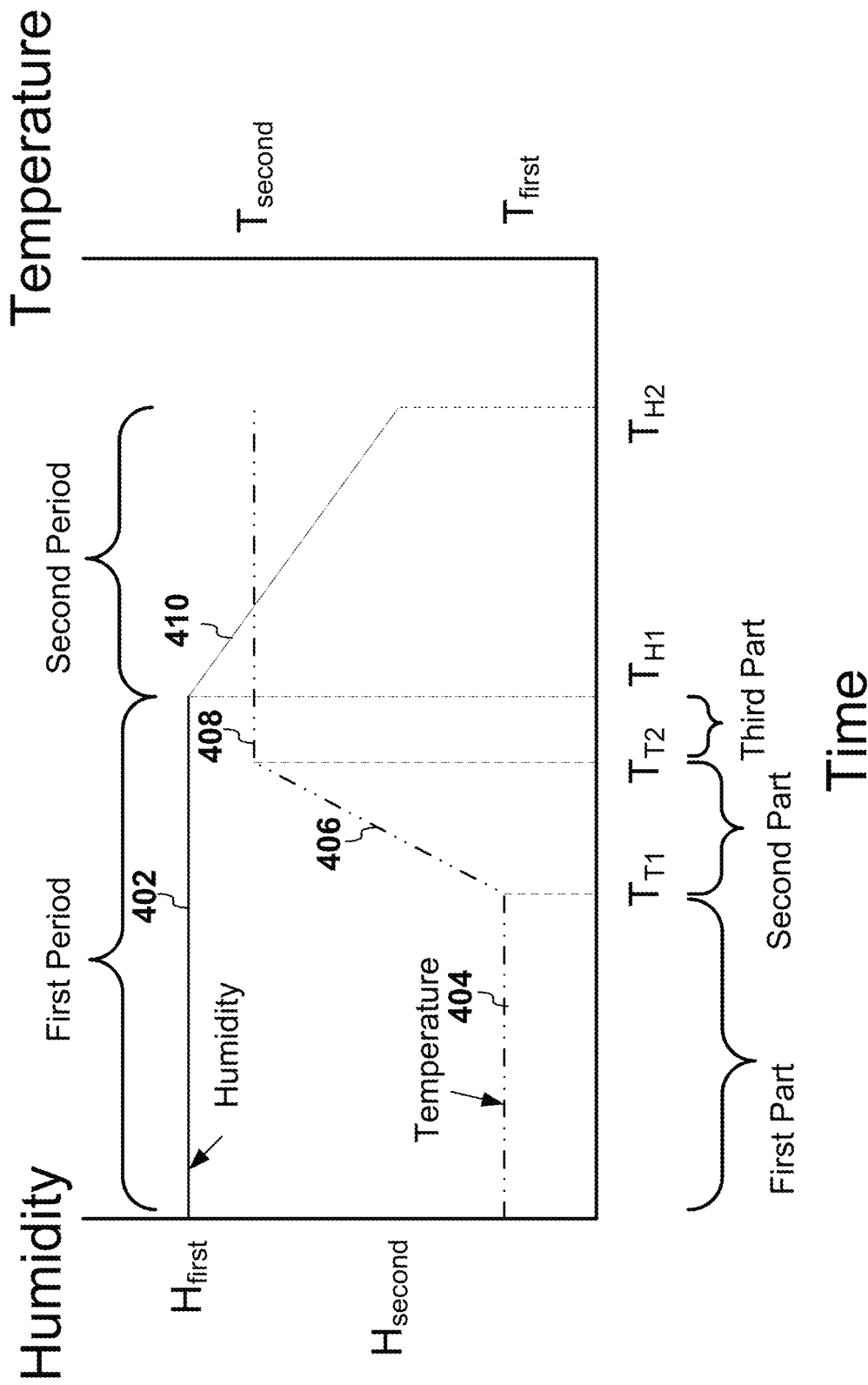
FIG. 4 illustrates a second method of reducing dry crack formation.

FIG. 4 illustrates a method of reducing dry crack formation in which the humidity and temperature of the gaseous atmosphere is varied. Operations may begin by exposing (402) an outer surface of a green body for a first period of time to a gaseous atmosphere having a first humidity, where the first humidity is relatively high. For example, the first humidity 306 may be a relative humidity within a range of about 50 percent to 100 percent. Alternatively, the first humidity 306 may be a relative humidity within a range of about 70 percent to about 95 percent. In another example, the first humidity 306 may be a relative humidity within a range of about 85 percent to about 95 percent. In still another example, the first humidity 306 may be a relative humidity within a range of about 90 percent to about 95 percent. In yet another example, the first humidity 306 may be a relative humidity within a range of about 80 percent to about 90 percent.

During the first period of time in which the gaseous atmosphere has the first humidity, operations further include holding (404) the gaseous atmosphere at a first temperature during a first part of the first period of time, where the first temperature is room temperature. The first part of the first period of time is within a range of about 10 hours to about 14 hours.

In addition, during the first period of time in which the gaseous atmosphere has the first humidity, operations include increasing (406) the temperature of the gaseous atmosphere from the first temperature (room temperature) to a second temperature over a second part of the first period of time. The second temperature may be a temperature within a range of about 80° C. to about 100° C. Alternatively, the second temperature may be a temperature within a range of about 85° C. to about 95° C. The second part of the first period may be within a range of about 1.0 hours to 2.5 hours. Alternatively, the second part of the first period may be within a range of about 1.5 hours to 2.5 hours.

Finally, during the first period of time in which the gaseous atmosphere has the first humidity, operations include holding (408) the temperature at the second temperature over a third part of the first period of time. The third part of first period may be within a range of about 1.5 hours to 2.5 hours. The first period of time is within a range of about 10 hours to about 16 hours depending on the lengths of the first part, the second part, and the third part of the first period of time.

After the first period of time, operations continue by reducing (410) the humidity of the gaseous atmosphere from the first humidity to a second humidity over a second period of time at the second temperature. The second humidity may be a relative humidity within a range of about 50 percent to about 65 percent. In another example, the second humidity 310 may be a relative humidity within a range of about 45 percent to about 60 percent.

The second period of time may be within a range of about 8 hours to about 14 hours. Alternatively, the second period of time may be within a range of about 10 hours to about 12 hours. For example, the second period of time may be about 12 hours. In another example, the second period of time may be about 8 hours.

In one example, the first period of time is about 16 hours, the first part of the first period of time is about 12 hours, the second part of the first period of time is about 2 hours, and the third part of the first period of time is about 2 hours.

As shown in FIG. 4, increasing (406) the temperature of the gaseous atmosphere from the first temperature to the second temperature over the second part of the first period of time may comprise increasing the temperature substantially linearly over the second part of the first period of time. Alternatively, increasing (406) the temperature of the gaseous atmosphere from the first temperature to the second temperature over the second part of the first period of time may comprise increasing the temperature exponentially. Alternatively or in addition, increasing (406) the temperature of the gaseous atmosphere from the first temperature to the second temperature over the second part of the first period of time may comprise increasing the temperature without lowering the temperature during the second part of the first period of time.

As shown in FIG. 4, reducing (410) the humidity of the gaseous atmosphere from the first humidity to the second humidity over the second period of time may comprise reducing the humidity of the gaseous atmosphere substantially linearly over the second period of time. Alternately, reducing (410) the humidity of the gaseous atmosphere from the first humidity to the second humidity over the second period of time may comprise reducing the humidity of the gaseous atmosphere exponentially during the second period of time. Alternatively or in addition, reducing (410) the humidity of the gaseous atmosphere from the first humidity to the second humidity over the second period of time may comprise reducing the humidity of the gaseous atmosphere without any increase in the humidity of the gaseous atmosphere during the second period of time. In some examples, reducing (410) the humidity of the gaseous atmosphere from the first humidity to the second humidity over the second period of time may comprise reducing the humidity of the gaseous atmosphere more slowly during a first part of the second period of time than during a second part of the second period of time. Alternatively, reducing (410) the humidity of the gaseous atmosphere from the first humidity to the second humidity over the second period of time may comprise reducing the humidity of the gaseous atmosphere faster during a first part of the second period of time than during a second part of the second period of time.

Any of the methods described above may further comprise sintering the green body after the second period of time. In addition, the methods may further include melt infiltrating the CMC.

The logic illustrated in FIGS. 3 and 4 may include additional, different, or fewer operations than illustrated. The operations illustrated may be performed in an order different than illustrated.

The term "about" as used herein means within a tolerance of +/−3%. For example, "about X" means a value in a range from (X−3 percent of X) to (X+3 percent of X).

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method of reducing dry crack formation, the method comprising: exposing an outer surface of a green body to a gaseous atmosphere having a first humidity for a first period of time at room temperature, the green body being a slurry-infiltrated ceramic fiber preform, the first humidity being a relative humidity within a range of about 40 percent to 100 percent, the first period of time being within a range of about six hours to about 12 hours; and reducing the humidity of the gaseous atmosphere, while the outer surface of the green body is exposed to the gaseous atmosphere at room temperature, from the first humidity to a second humidity over a second period of time, the second humidity being a relative humidity within a range of about 50 percent to about 65 percent or within a range of about 45 percent to about 60 percent, the second period of time being within a range of about 12 hours to about 18 hours.

A second aspect relates to the method of aspect 1, wherein the first humidity is a relative humidity within a range of about 70 percent to about 95 percent.

A third aspect relates to any preceding aspect, wherein the first period of time is about 12 hours, and the second period of time is about 12 hours.

A fourth aspect relates to any preceding aspect, wherein reducing the humidity of the gaseous atmosphere over the second period of time comprises reducing the humidity of the gaseous atmosphere without any increase in the humidity of the gaseous atmosphere during the second period of time.

A fifth aspect relates to any preceding aspect, wherein reducing the humidity of the gaseous atmosphere over the second period of time comprises reducing the humidity of the gaseous atmosphere substantially linearly during the second period of time.

A sixth aspect relates to any of aspects 1 to 4, wherein reducing the humidity of the gaseous atmosphere over the second period of time comprises reducing the humidity of the gaseous atmosphere substantially exponentially during the second period of time.

A seventh aspect relates to any of aspects 1 to 4, wherein reducing the humidity of the gaseous atmosphere over the second period of time comprises reducing the humidity of the gaseous atmosphere more slowly during a first part of the second period of time than during a second part of the second period of time.

An eighth aspect relates to any of aspects 1 to 4, wherein reducing the humidity of the gaseous atmosphere over the second period of time comprises reducing the humidity of the gaseous atmosphere faster during a first part of the second period of time than during a second part of the second period of time.

A ninth aspect relates to any preceding aspect, wherein the first humidity limits moisture differentials within the green body during the first period of time as compared to a humidity that is lower than the first humidity, and wherein exposure of the outer surface of the green body to the first humidity during the first period limits a moisture differential within the green body during the second period.

A tenth aspect relates to any preceding aspect, wherein the gaseous atmosphere includes air at one atmosphere of pressure.

An eleventh aspect relates to a method of reducing dry crack formation, the method comprising: exposing an outer surface of a green body for a first period of time to a gaseous atmosphere having a first humidity, the first humidity being a relative humidity within a range of about 50 percent to 100 percent, the first period of time being within a range of about 10 hours to about 16 hours, the green body being a slurry-infiltrated ceramic fiber preform; holding the gaseous atmosphere at a first temperature during a first part of the first period of time, the first temperature being room temperature, the first part of the first period of time being within a range of about 10 hours to about 14 hours; increasing the temperature of the gaseous atmosphere from the first temperature to a second temperature over a second part of the first period of time, the second part of the first period of time being within a range of about 1.0 hours to 2.5 hours, the second temperature with a range of about 80° C. to about 100° C.; holding the temperature at the second temperature over a third part of the first period of time, the third part of the first period within a range of about 1.5 hours to 2.5 hours; and reducing the humidity of the gaseous atmosphere from the first humidity to a second humidity over a second period of time at the second temperature, the second humidity being a relative humidity within a range of about 50 percent to about 65 percent or within a range of about 45 percent to about 60 percent, the second period of time being within a range of about 8 hours to about 14 hours.

A twelfth aspect relates to the method of aspect 11, wherein the first humidity is a relative humidity within a range of about 70 percent to about 95 percent.

A thirtieth aspect relates to any of aspects 11 to 12, wherein the first period of time is about 16 hours, the first part of the first period of time is about 12 hours, the second part of the first period of time is about 2 hours, and the third part of the first period of time is about 2 hours.

A fourteenth aspect relates to any of aspects 11 to 13, wherein the second period of time is within a range of about 10 hours to about 12 hours.

A fifteenth aspect relates to any of aspects 11 to 14, wherein the second period of time is about 12 hours.

A sixteenth aspect relates to any of aspects 11 to 14, wherein the second period of time is about 8 hours.

A seventeenth aspect relates to any of aspects 11 to 16, wherein increasing the temperature of the gaseous atmosphere from the first temperature to the second temperature over the second part of the first period of time comprises increasing the temperature substantially linearly over the second part of the first period of time.

An eighteenth aspect relates to any of aspects 11 to 17, wherein reducing the humidity of the gaseous atmosphere from the first humidity to the second humidity over the second period of time comprises reducing the humidity of the gaseous atmosphere substantially linearly over the second period of time.

A nineteenth aspect relates to any of aspects 11 to 17, wherein reducing the humidity of the gaseous atmosphere from the first humidity to the second humidity over the second period of time comprises reducing the humidity of the gaseous atmosphere exponentially over the second period of time.

A twentieth aspect relates to any preceding aspect further comprising sintering the green body after the second period of time.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of reducing dry crack formation in a ceramic matrix composite, the method comprising:

exposing an outer surface of a green body to a gaseous atmosphere having a first humidity for a first period of time at room temperature, the green body being a slurry-infiltrated ceramic fiber preform comprising a plurality of fiber plies or a plurality of prepreg tape layers comprising fibers, the first humidity being a relative humidity within a range of about 40 percent to 100 percent, the first period of time being within a range of about six hours to about 12 hours; and reducing the humidity of the gaseous atmosphere, while the outer surface of the green body is exposed to the gaseous atmosphere at room temperature, from the first humidity to a second humidity over a second period of time, the second humidity being a relative humidity within a range of about 50 percent to about 65 percent or within a range of about 45 percent to about 60 percent, the second period of time being within a range of about 12 hours to about 18 hours.

2. The method of claim 1, wherein the first humidity is a relative humidity within a range of about 81 percent to about 95 percent.

3. The method of claim 1, wherein the first period of time is about 12 hours, and the second period of time is about 12 hours.

4. The method of claim 1, wherein reducing the humidity of the gaseous atmosphere over the second period of time comprises reducing the humidity of the gaseous atmosphere without any increase in the humidity of the gaseous atmosphere during the second period of time.

5. The method of claim 1, wherein reducing the humidity of the gaseous atmosphere over the second period of time comprises reducing the humidity of the gaseous atmosphere substantially linearly during the second period of time.

6. The method of claim 1, wherein reducing the humidity of the gaseous atmosphere over the second period of time comprises reducing the humidity of the gaseous atmosphere substantially exponentially during the second period of time.

7. The method of claim 1, wherein reducing the humidity of the gaseous atmosphere over the second period of time comprises reducing the humidity of the gaseous atmosphere more slowly during a first part of the second period of time than during a second part of the second period of time.

8. The method of claim 1, wherein reducing the humidity of the gaseous atmosphere over the second period of time comprises reducing the humidity of the gaseous atmosphere faster during a first part of the second period of time than during a second part of the second period of time.

9. The method of claim 1, wherein the first humidity limits moisture differentials within the green body during the first period of time as compared to a humidity that is lower than the first humidity, and wherein exposure of the outer surface of the green body to the first humidity during the first period limits a moisture differential within the green body during the second period.

10. The method of claim 1, wherein the gaseous atmosphere includes air at one atmosphere of pressure.

11. The method of claim 1 further comprising sintering the green body.

* * * * *